324-66 CROSS REFERENCE SEARCH ROOM

Nov. 18, 1969 D. T. MORAR 3,479,602

APPARATUS FOR COHERENT GENERATION OF A RADIO FREQUENCY SPECTRUM IN AMPLITUDE AND PHASE

Filed Aug. 8, 1966

Donald T. Morar,
INVENTOR.
BY Harry M. Saragovitz
Edward J. Kelly
Herbert Berl
Alfred E. Smith

United States Patent Office 3,479,602

Patented Nov. 18, 1969

3,479,602

APPARATUS FOR COHERENT GENERATION OF A RADIO FREQUENCY SPECTRUM IN AMPLITUDE AND PHASE

Donald T. Morar, Woodbine, Md., assignor to the United States of America as represented by the Secretary of the Army

Filed Aug. 8, 1966, Ser. No. 571,142

Int. Cl. H03b *19/06*

U.S. Cl. 328—14 2 Claims

ABSTRACT OF THE DISCLOSURE

A system for generating a complex radio frequency spectrum of arbitrary frequency and/or time function. The radio frequency spectrum is obtained by an initial spectrum amplified in a relatively flat traveling wave tube and supplied to a wide band multicoupler with various outputs having frequency stability to isolate the various spectral lines. Each of these various channels may then have its phase and/or amplitude adjusted so as to produce the desired total response at the output of the adder multicoupler.

An object of the present invention is to provide a more direct approach toward coherent spectrum synthesis.

A further object of the present invention is to provide a system usable as a transmitter or receiver spectrum simulator for C band synthetic radars, with a minimum of hardware costs and size.

Another object of the present invention is to provide a system for generating a highly stable spectrum for radar system use.

Figure 1:
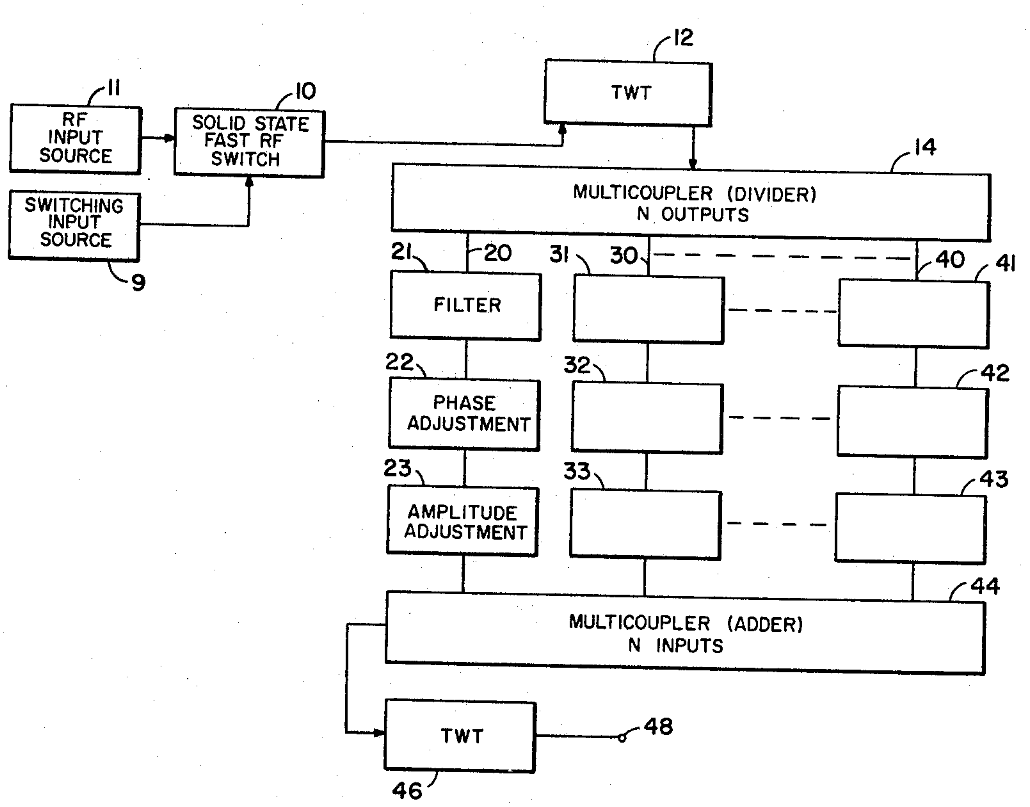
Figure 2:
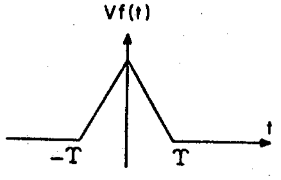

In order that those skilled in the art to which this invention applies may understand how to make and use the same, I will describe its construction in detail, referring by numerals to the accompanying drawings and wave shapes forming a part of this application, in which:

FIGURE 1 is a block diagram illustration showing apparatus embodying elements for carrying out the invention described herein, and FIGURE 2 is a graph showing the triangular keying pulse shape whose spectral envelope is applied to a very fast solid state diode type of radio frequency switch.

Referring to FIGURE 1, a triangular wave form switching spike pulse (illustrated in FIGURE 2) is applied to a very fast diode type of radio frequency switch 10, from source 9, thereby gating through radio frequency switch 10 very narrow radio frequency bursts from radio frequency input source 11. Associated with these radio frequency busts will be a radio frequency spectrum whose shape, bandwidth, and line spacing would be controllable by proper choice of the gate width and switching rate of solid state switch 10. This radio frequency spectrum, presumably less than 8 giga-cycles and centered at approximately 6 giga-cycles, would then be amplified by a presumably flat traveling wave tube 12, and further supplied to a wide band multicoupler 14. The various outputs of wide band multicoupler 14, represented by numbers 20, 30, and 40 (but not limited to three) are then supplied to cavity filters 21, 31, and 41 with the required frequency stability to isolate the various spectral lines. Each of these three channels may then have its phase and amplitude adjusted represented by 22, 32, and 42 and 23, 33, and 43 respectively so as to produce the desired total response at the output of adder multicoupler 44. A moderate amount of gain in the second traveling wave tube 46 would permit shaping any desired spectrum at output terminal 48 by approximately adjusting phases 22, 32, and 42 and amplitudes 23, 33, and 43. The line spacing of the total response at the output of adder multicoupler 44 would simply be a matter of choice of repetition rate.

Referring to the triangular wave form switching spike pulse of FIGURE 2 in more detail, the following description can be seen. For generating C band spectrums of typically 10% bandwidth, a switching pulse width of 1 nano-second would produce a spectrum with zero crossings $\pm 1$ giga-cycle about the central, or 2 giga-cycles bandwidth. Assuming the triangular keying pulse spectrum is of the form $$\left(\frac{\sin \omega\gamma/2}{\omega\gamma/2}\right)^2$$

and whose spectral envelope decreases, the energy at $\pm .5$ giga-cycle would only be down 60%. A moderate amount of gain in the second traveling wave tube would permit shaping any desired spectrum at output terminal 48 and/or time function by approximately adjusting the various phase and ampltiude controls 22, 32, 42, 23, 33, and 43. The resulting total response of the radio frequency spectrum can then be applied as desired.

While I have describde and illustrated one specific embodiment of the invention, it will be clear that variations of the general arrangement and of the details of construction which are specifically illustrated and described may be resorted to without department from the spirit and scope of the invention as defined in the appended claims.

I claim:

1. A system for generating a complex radio frequency spectrum of a desired frequency or time function comprising: a radio frequency source providing radio frequency signals at its output; gating means for gating said radio frequency signals into a narrow radio frequency burst spectrum; a first traveling wave tube amplifier having an input and an output terminal, with said input terminal connected to said narrow radio frequency burst spectrum for amplifying said radio frequency burst spectrum; a wide range multicoupler having an input terminal and a plurality of output terminals, said input of said wide range multicoupler connected to said output terminal of said first traveling wave tube amplifier and being used for dividing said amplified radio frequency burst spectrum into a plurality of outputs; a plurality of cavity filters including amplitude and phase adjusting means, each of said plurality of cavity filters having an input and an output with said inputs connected to said plurality of output terminals of said wide range multicoupler for isolating various spectral lines of said spectrum; an adder multicoupler having a plurality of inputs and a single output, with said plurality of inputs being connected to said plurality of outputs of said cavity filters and used for adding said various spectral lines at the output of said adder multicoupler; and a second traveling wave tube amplifier having an input an an output, with said input being connected to said output of said adder multicoupler for amplifying said various spectral lines into a desired spectrum at the output of said second traveling wave tube amplifier.

2. A spectrum generator as set forth in claim 1 wherein said gating means includes a diode switch.

References Cited

UNITED STATES PATENTS 3,090,953 5/1963 Frank ---------- 328—103 XR
3,112,452 11/1963 Kirkpatrick ----- 328—117 XR JOHN S. HEYMAN, Primary Examiner STANLEY D. MILLER, Assistant Examiner U.S. Cl. X.R.

328—162, 167, 178; 324—77